US008578397B2

United States Patent
King et al.

(10) Patent No.: US 8,578,397 B2
(45) Date of Patent: Nov. 5, 2013

(54) SYSTEM AND METHOD FOR SUPPORTING A REMOTE ISOCHRONOUS DEVICE

(75) Inventors: James M King, Fort Collins, CA (US); Rick Aulino, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 139 days.

(21) Appl. No.: 13/147,666

(22) PCT Filed: Feb. 27, 2009

(86) PCT No.: PCT/US2009/035551
§ 371 (c)(1),
(2), (4) Date: Aug. 3, 2011

(87) PCT Pub. No.: WO2010/098772
PCT Pub. Date: Sep. 2, 2010

(65) Prior Publication Data
US 2011/0296441 A1  Dec. 1, 2011

(51) Int. Cl.
*G06F 3/00* (2006.01)
(52) U.S. Cl.
USPC .......................................... 719/321
(58) Field of Classification Search
USPC ................................. 719/310, 321
See application file for complete search history.

(56) References Cited

U.S. PATENT DOCUMENTS

| | | | |
|---|---|---|---|
| 5,953,350 A | 9/1999 | Higgins | |
| 6,587,480 B1 | 7/2003 | Higgins et al. | |
| 6,823,336 B1 * | 11/2004 | Srinivasan et al. | 1/1 |
| 6,948,044 B1 * | 9/2005 | Chandrasekaran | 711/203 |
| 7,457,880 B1 * | 11/2008 | Kim | 709/229 |
| 8,175,528 B2 * | 5/2012 | He et al. | 455/41.2 |
| 2003/0005197 A1 * | 1/2003 | Abramson et al. | 710/300 |
| 2003/0069886 A1 * | 4/2003 | Jaskiewicz | 707/10 |
| 2005/0138229 A1 | 6/2005 | Sartore | |
| 2006/0120402 A1 * | 6/2006 | Gallant | 370/466 |
| 2007/0294456 A1 | 12/2007 | Chan et al. | |
| 2008/0082639 A1 | 4/2008 | Hochmuth et al. | |
| 2008/0282011 A1 | 11/2008 | Tsai et al. | |
| 2009/0024746 A1 | 1/2009 | Welch | |

OTHER PUBLICATIONS

Kernel Korner, How to write a Linux USB Device Driver, Jun. 18, 2006.*
James M. King and Rick Aulino, Notification of Transmittal of the International Search Report and the Written Opinion of the International Searching Authority, or the Declaration, International Application No. PCT/US2009/035551 filed Feb. 27, 2009, Date of Mailing: Nov. 18, 2009, pp. 1-11.
IPRP, Priority application PCT/US2009/035551, Sep. 9, 2011.

* cited by examiner

*Primary Examiner* — Lechi Truong

(57) ABSTRACT

A system and method are provided for supporting remote isochronous devices effectively. In one embodiment, first and second computer hosts include first and second virtual interposer logic, first and second send/receive logic and first and second at least partial device driver stacks therein. The first and second send/receive logics are configured to communicate packets between one another, representing commands and data passing between a user-level application at the first host and a peripheral device at the second host. The first and second virtual interposer logics are configured to interface the first and second send/receive logics to the first and second at least partial device driver-stacks within their respective hosts. To achieve low-latency transactions, the system includes speculative write completion functionality and/or speculative read functionality.

10 Claims, 4 Drawing Sheets

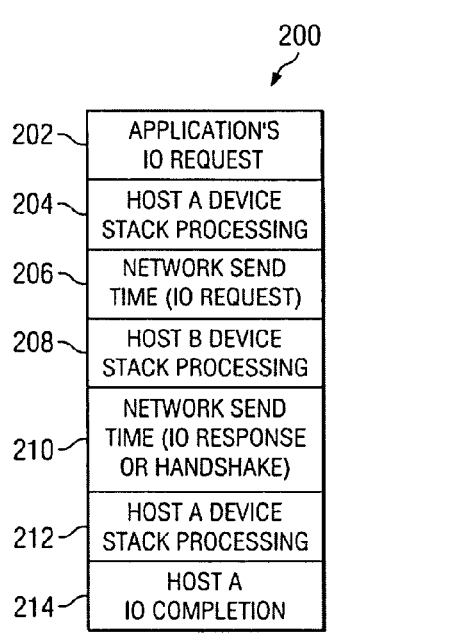
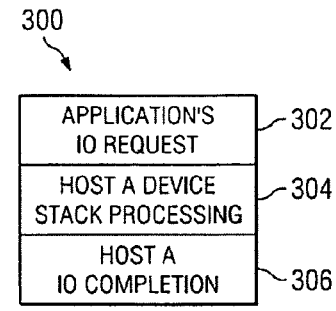
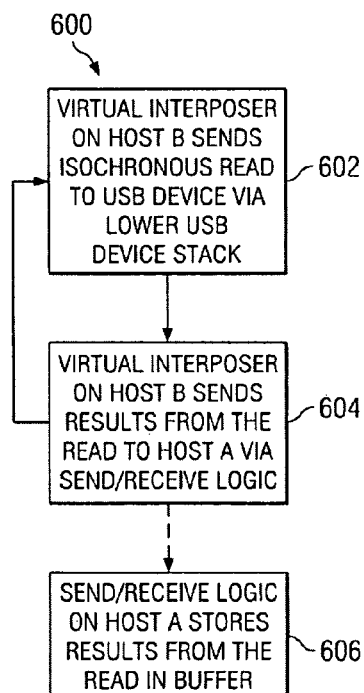
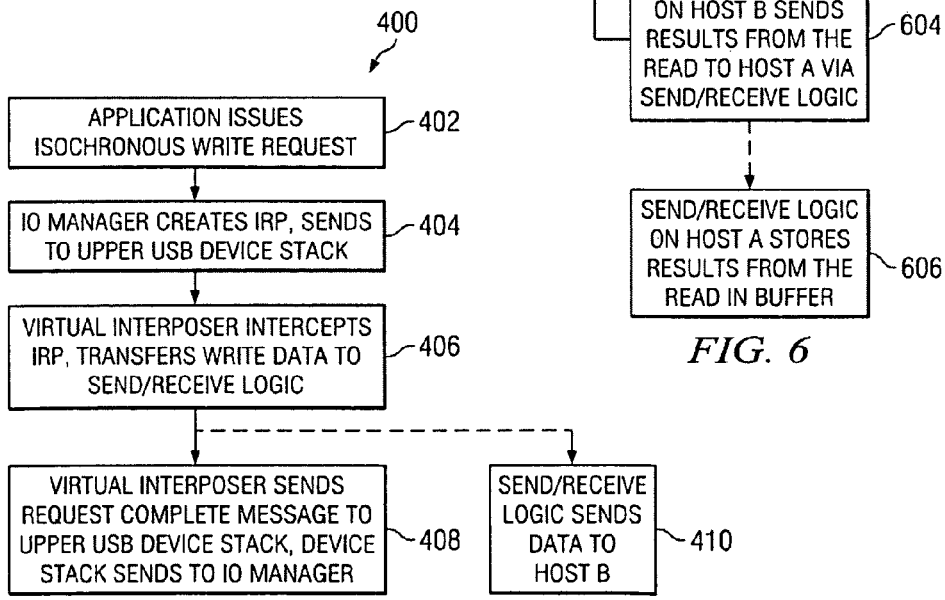

SYSTEM AND METHOD FOR SUPPORTING A REMOTE ISOCHRONOUS DEVICE

FIELD OF THE INVENTION

This invention relates generally to techniques for causing peripheral devices that are attached to a first computer host to be accessible to resources that are running on a second computer host remote from the first.

BACKGROUND

Protocols exist, that enable a user at a local computer to access and share the desktop of a remote computer (e.g. a central server) over a computer network. One such protocol is the Remote Desktop Protocol ("RDP"), as provided by Microsoft Corporation, which provides remote display and input capabilities over network connections. Another protocol that can be used in this context is the Remote Graphics Software ("RGS") protocol from the Hewlett Packard Co. RGS is designed to take advantage of the computer and graphics resources of a remote computer to deliver interactive remote access at the local computer. The desktop video data of the remote computer is transmitted over a network to the local computer, which displays the desktop video data locally in a window at the local computer. RGS captures user keyboard and mouse inputs at the local computer, and sends the keyboard and mouse inputs to the remote computer for processing by the operating system of the remote computer, and by applications running on the remote computer. RGS also allows data of some peripheral devices such as storage devices to be communicated from the local computer to the remote computer.

One general class of peripheral devices is the class of devices that can generate or receive isochronous data (an "isochronous device"). Isochronous data, by its nature, is intended to be continuous and real-time in its creation, delivery and consumption. Because timing-related information is implied by the steady rate at which isochronous data is received and transferred, isochronous data must be delivered at least as fast as it is generated in order for it to be used as intended. For example, when voice data is being transmitted from an isochronous device, any delays or discontinuities in the transmitted data stream can cause drop-outs or other irregularities to be noticed audibly at the receiver.

BRIEF DESCRIPTION OF THE DRAWINGS

FIG. 2 is a block diagram illustrating components of a high-latency IO transaction.

FIG. 3 is a block diagram illustrating components of a low-latency IO transaction according to a preferred embodiment of the invention.

FIG. 4 is a flow diagram illustrating a low-latency write transaction according to a preferred embodiment of the invention.

FIG. 6 is a flow diagram illustrating processing steps in support of a low-latency read transaction according to a preferred embodiment of the invention.

DETAILED DESCRIPTION OF THE PREFERRED EMBODIMENTS

Figure 1:
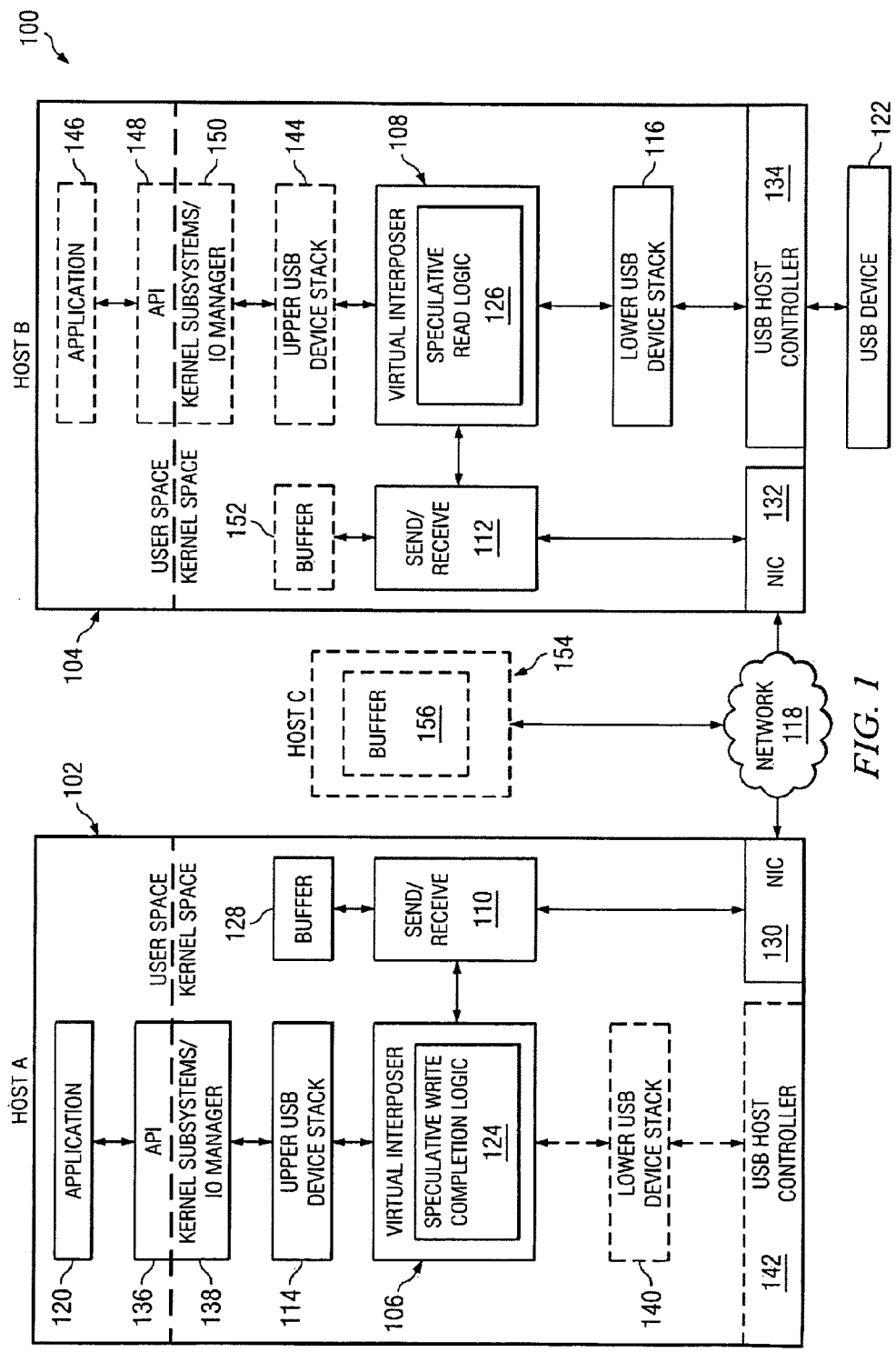
FIG. 1 is a block diagram illustrating a system for supporting a remote isochronous data device according to preferred embodiments of the invention.

FIG. 1 illustrates a system 100 for supporting a remote isochronous data device according to a preferred embodiment of the invention. System 100 includes first and second distinct computer hosts 102, 104. Each of hosts 102, 104 contains a virtual interposer logic 106, 108, a send/receive logic 110, 112 and at least a partial device driver stack 114, 116. Send/receive logics 110, 112 are configured to communicate packets between one another via a network 118. The packets represent commands and data passing between a user-level application. 120 at host 102 and a peripheral device 122 at host 104. Virtual interposer logic 106 is configured to interface send/receive logic 110 with at least partial device driver stack 114 host 102. Similarly, in host 104, virtual interposer logic 108 is configured to interface send/receive logic 112 with at least partial device driver stack 116. Virtual interposer logic 106 may include speculative write completion logic 124, and virtual interposer logic 108 may include speculative read logic 126. (The behavior of speculative write completion logic 124 and speculative read logic 126 will be discussed in more detail below.) Preferably, host 102 includes a buffer 128 accessible by send/receive logic 110. Also, each one of hosts 102, 104 includes some means for physically interfacing with network 118. For example, each of hosts 102, 104 may include a network interface card ("NIC") 130, 132. Similarly, host 104 will preferably include some means for connecting with peripheral device 122, such as by means of a Universal Serial Bus ("USB"), host controller 134.

In some embodiments, a buffer. 152 may be located in host 104. In yet other embodiments, a buffer 156 may be located in a host 154 that is distinct from hosts 102, 104 but connected to hosts 102, 104 in some way, such as via network 118.

The operating environment within hosts 102, 104, 154 need not be the same. For example, either host may use a Microsoft Windows operating system or a Linux operating system or some other type of operating system. Depending on the host environment, application 120 may communicate with at least partial device driver stack 114 by means of an application programming interface ("API") 136, which in turn utilizes functionality exported by kernel subsystems and input/output ("IO") manager 138. Optionally, host 102 may also include a lower device driver stack 140 and a means—such as USB host controller 142—for connecting to its own optional peripheral devices. Also optionally, host 104 may include an upper device driver stack 144 that is in communication with an optional application 146 via ah optional API 148 and optional kernel subsystems and IO manager 150. Network 118 may be any kind of network such as a wired or wireless local area network, an intranetwork, the Internet or any combination of these or other kinds of networks. For example, network 118 may be a TGP/IP or UDP/IP network. And at least partial device driver stacks 114, 116 may be any kind of device driver stacks. In one embodiment, they may be upper and lower USB device driver stacks, respectively. In the vocabulary of the Microsoft Windows Driver Foundation, an example of an upper USB device driver stack would be a function driver object ("FDO"), and an example of a lower USB device driver stack would be a physical device object ("PDO").

In order to understand how system 100 can be used to produce low-latency isochronous data transactions, it will be useful first to understand the time components of a high-latency 10 transaction. FIG. 2 illustrates such a high-latency 10 transaction 200. At step 202, application 120 generates an IO request (e.g. a read or a write request). At step 204, this IO request is processed within the upper device stack of host 102. For example, kernel subsystems/IO manager 138 may create an IO request packet ("IRP") corresponding to the request and may send the IRP to upper device stack 114 for processing. Virtual interposer 106 would then intercept the IRP and send commands and/or data representing the IO request to host 104 via send/receive logic 110, NIC 130 and network 118. The latter step corresponds to network send time 206. At me receiving end, at step 208, the commands and/or data representing the IO request are further processed by the lower device stack of host 104. For example, virtual interposer 108 may access the received commands and/or data from send/receive logic 112 and may create an appropriate IO request for submission to lower device stack 116. If the IO request is a read request, then resulting data will need to be sent back to host 102 in step 210. Even if the IO request is a write request, typically some form of handshake or acknowledgment will be sent from host 104 back to host 102 indicating the completion of the write request. In step 212, this resulting data or this completion handshaking must be processed by the device stack in host 102. Ultimately, upper device stack 114 can complete the IO request by delivering resulting data up to application 102 or by otherwise indicating to kernel subsystems/IO manager 138 that the IO request has been completed.

For isochronous data devices such as an isochronous USB device 122, this kind of latency can be problematic: The USB standard dictates that every transaction is to be initiated by a host controller, typically in response to an IO request generated by an application. Moreover, according to the USB standard, each segment of data that is transferred in an isochronous context must be transferred in a separate distinct transaction (e.g. an isochronous IN or OUT transaction). Consequently, an isochronous context appears as a long series of distinct USB transactions. But in the case of remote USB implementations, the initiating application in these transactions is separated from the initiating host controller by a network like network 118. Thus, every distinct transaction in the series would ordinarily resemble high-latency transaction 200.

The inventors hereof have determined, however, that it is possible to achieve low-latency IO transactions 300 even in a remote context. In a low-latency transaction 300, application 120 generates an IO request at step 302. At step 304, the IO request is processed by the device stack in host 102 as it was in step 204 of high-latency transaction 200. But immediately thereafter, in step 306 of the low-latency transaction, application 120 is notified that the IO request is complete. For a read IO transaction, this means that data, is delivered to application 120 in response to the read request in step 306. For a write IO transaction, this means that application 120 is told in step 306 that the write has been executed so that application 120 may then immediately begin preparing subsequent IO request.

More discussion regarding ways to achieve low-latency transactions 300 in a remote context will now be provided in relation to FIGS. 4-7. FIG. 4 illustrates a low-latency write transaction 400 according to one preferred embodiment of the invention in which peripheral device 122 is a USB device. In other embodiments, device 122 may be a non-USB device. In step 402, application 120 may issue an isochronous write request. (Typically but not necessarily, the isochronous write request will be a non-blocking system call from the point of view of application 120.) In step 404, kernel subsystems/IO manager 138 may create an IRP corresponding to the write request and may send the IRP to upper USB device stack 114. In step 406, virtual interposer 106 may intercept the IRP and transfer the corresponding write data to send/receive logic 110. In step 408, immediately after the write data has been transferred safely to send/receive logic 110, virtual interposer 106 may then indicate to upper USB device stack 114 that the IO request is complete, and device stack 114 may relay the completion status to kernel subsystems/IO manager 138. Meanwhile, the activity of step 410 may be taking place simultaneously. That is, send/receive logic 110 may begin sending the write data for the requested transaction to host 104 via network 118. But the request complete indication given in step 408 may occur before the data are actually transmitted to host 104 in step 410. The latter functionality may be implemented by speculative write completion logic 124 in virtual interposer 106. In this manner, kernel subsystems/IO manager 138 need not hold resources (e.g. pending IRP resources) during components 208-212 of the transaction. Instead, according to embodiments of the invention, those resources may be freed much earlier in time. As a consequence, from the point of view of device 122, delays and discontinuities between individual write transactions in a series of isochronous write transactions may be reduced with beneficial effect.

Figure 5:
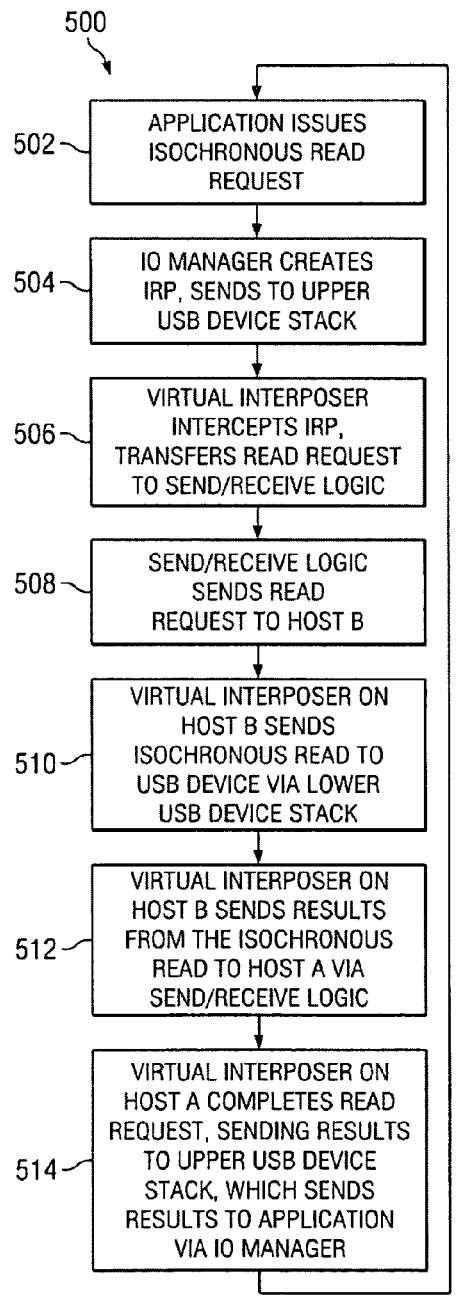
FIG. 5 is a flow diagram illustrating a high-latency read transaction.
Figure 7:
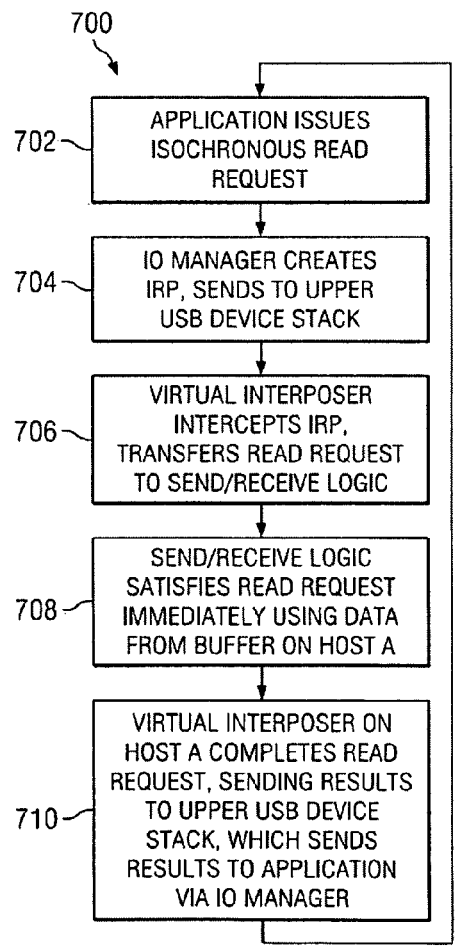
FIG. 7 is a flow diagram illustrating a low-latency read transaction according to a preferred embodiment of the invention.

FIGS. 6-7 illustrate a (low-latency) speculative isochronous USB read transaction mode according to one preferred embodiment of the invention. In some embodiments, this mode may be activated in response to detecting that one or more (high-latency) actual isochronous USB read transactions have occurred between hosts 102 and 104. Such a high-latency actual isochronous USB read transaction is illustrated in FIG. 5 at 500. Specifically, in such a transaction, application 120 generates an isochronous read request in step 502. In step 504, kernel subsystems/IO manager 138 creates a corresponding IRP and sends the IRP to upper USB device stack 114. In step 506, virtual interposer 106 intercepts the IRP and indicates a read request to send/receive logic 110. In step 508, send/receiver logic 110 communicates the read request to host 104. In step 510, virtual interposer 108 in host 104 generates an isochronous read request to lower USB device stack 116. When device stack 116 responds with resulting data in step 512 virtual interposer 108 sends, the results from the read to host 102 via send/receive logic 112. In step 514, virtual interposer 106 in host 102 then completes the read request by sending the results to upper USB device stack 114, which in turn sends the/results to application 120 via kernel subsystems/IO manager 138.

FIG. 6 illustrates activities 600 that may occur in hosts 102, 104 to support a low-latency read transaction 700 illustrated in FIG. 7 when speculative read mode is active. In steps 602 and 604 of FIG. 6, speculative read logic 126 in virtual interposer 108 may begin repeatedly issuing speculative isochronous read requests to lower USB device stack 116. Virtual interposer 108 sends the results of these speculative reads to host 102 via send/receive logic 112. Note that the speculative read requests issued in step 602 may occur autonomously in host 104, even in the absence of any unsatisfied read request from host 102 being present in host 104. In step 606, send/receive logic 110 in host 102 may store the speculative read data from host 104 in a buffer 128. Buffer 128 may take any form. In one embodiment, buffer 128 may be a circular buffer in which oldest buffer data are overwritten by newer data in circular fashion if buffer 128 has become full and the oldest buffered data have not yet been consumed by a consumer process such as application 120. Alternatively, other non-circular buffer implementations may also be used.

FIG. 7 illustrates a low-latency read transaction 700 that is made possible by the activity of FIG. 6. In step 702, application 120 issues an isochronous read request. In step 704, kernel subsystems/IO manager 138 creates a corresponding IRP and sends the IRP to upper USB device stack 114. In step 706, virtual interposer 106 intercepts the IRP and transfers a read request to send/receive logic 110. In step 708, send/receive logic 110 satisfies the read request immediately, using data that it retrieves from buffer 128, without transmitting a read request to host 104. In step 710, virtual interposer 106 completes the read request by sending the results to upper USB device stack 114, which forwards the results to application 120 via kernel subsystems/IO manager 138. In this manner, a low-latency read transaction like transaction 300 is achieved even in a remote context.

In another class of embodiments, a buffer 152 may be provided in host 104 either in addition to or in lieu of buffer 128 in host 102. In such embodiments, activities 600 may be modified as follows. In step 604, virtual interposer 108 may store the speculative read data in buffer 152, and only later send the data to host 102. In these embodiments, the sending of the data to host 102" may occur in response to a request from host 102 for data. (Step 708 may be modified accordingly such that the request is satisfied from the buffer 152 in host 104.) In this manner, latency associated with step 208 in the overall transaction may be eliminated.

In yet another class of embodiments, a buffer 156 may be provided in a third host 154. In such embodiments, activities 600 and 700 may be modified as follows. In step 604, virtual interposer 108 may send the speculative read data to buffer 156 in host 154, and host 154 therefore does the buffering in step 608. Then, in step 708, send/receive logic 110 satisfies the actual isochronous read request from buffer 156 on host 154 by transmitting a read request to host 154. In these embodiments, host 102 need not send the actual read request to host 104. It is believed that this class of embodiments may be most useful in circumstances where the network connection between hosts 102 and 154 is faster than the network connection between hosts 102 and 104. Under those conditions, latency associated with step 208 may be eliminated as in the previous example, but also latency associated with steps 206 and 210 may be reduced from the point of view of the IO transaction being requested by host 102.

Figure 8:
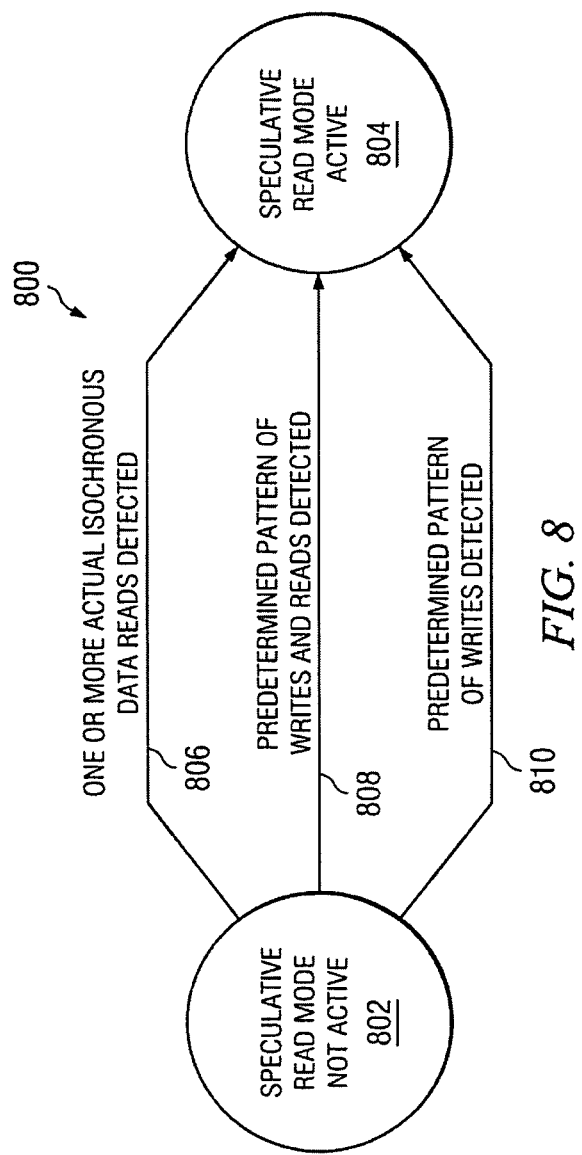
FIG. 8 is a state diagram illustrating methods for activating speculative read functionality according to preferred embodiments of the invention.

FIG. 8 is a state diagram illustrating several methods 800 by which any of the speculative read functionality described above may be activated in preferred embodiments of the invention. Assume system 100 is in a state 802 such that speculative read functionality is not active. System 100 may then enter state 804—wherein speculative read functionality is activated—after logic in the hosts detects that one or more actual isochronous read requests have been sent to host 104. (See transition 806.) Also, system 100 may enter state 804 when logic in the hosts, detects a specific predetermined pattern of writes and reads having been sent from host 102 to device 122. (See transition 808.) In addition, system 100 may enter state 804 when logic in the hosts detects a specific predetermined pattern of only writes having been sent from host 102 to device 122, (See transition 810.) It is believed that transitions 808 and 810 will be most useful when a series of isochronous reads typically follows some predictable configuration activity. For example, host 102 may typically query peripheral 122 for state or capability information or other characteristics prior to initiating a series of isochronous data reads. It may use one or more read transactions to do so, and may also issue configuration commands to peripheral 122 using one or more write transactions. Logic in the hosts may inspect such reads and writes to look, for example, for accesses to certain endpoints in USB devices (such as control endpoints) that are typical preludes to a series of isochronous data read transactions on the peripheral. It should be understood that embodiments of the invention that employ speculative read functionality need not implement all of transitions 806-810 to be effective, but may instead implement none or just one or two of the transitions.

It should be noted that the logic described above need not be implemented in discrete components as illustrated. For example, any of all of virtual interposer 106, speculative write completion logic 124, send/receive logic 110 and buffer 128 may be implemented integrally with equivalent effect. And any or all of virtual interposer 108, speculative read logic 126, send/receive logic 112 and buffer 152 may be implemented integrally with equivalent effect. In such embodiments, the activities of and connections between any discrete components that are described in the claims, written description, and drawings hereof should instead be attributed to the integrally formed and equivalent logic component.

Except for the inventive logic described; above; the remainder of hosts 102, 104, 154 may be conventional and may take any form, and hosts 102, 104, 154 need not be the same. For example, either host may be a server computer, a desktop computer, a laptop computer, an embedded computer, a mobile computer or any other kind of computing/device suitably configured in general accordance with the above description. All of the logic described, above may be implemented in hardware, software, firmware or any combination thereof. For example, any or all of the logic may take the form of instructions stored on a computer-readable storage medium which, when executed by a computer, cause the computer to perform the logic. Such a computer-readable storage medium may take any conventional form now known or yet to be developed including, for example, optical or magnetic disks, magnetic tapes, solid state static or dynamic random access memory, solid state read-only memory, flash memory or the like.

While the invention has been described in detail with reference to preferred embodiments thereof, the described embodiments have been presented by way of example and not by way of limitation. It will be understood by those skilled in the art and having reference to this specification that various changes may be made in the form and details of the described embodiments without deviating from the spirit and scope of the invention, as defined by the appended claims.

What is claimed is:

1. A system, comprising:
   first and second host computers having, respectively, first and second virtual interposer logic, first and second send/receive logic and first and second at least partial device driver stacks therein; wherein:
   the first and second send/receive logics are configured to communicate packets between one another via a network, the packets representing commands and data passing between a user-level application at the first host computer and a peripheral device at the second host computer;
   the first and second virtual interposer logics are configured to interface the first and second send/receive logics to the first and second at least partial device driver stacks within their respective host computers; and
   the system includes at least one configuration chosen from the following group:
   (1) speculative write completion functionality in the first virtual interposer logic, wherein the speculative write completion functionality comprises logic for indicating to the first at least partial device driver stack that an isochronous write request has been completed even though the isochronous write request has not yet actually been transmitted to the second host computer, and (2) speculative read functionality in the second virtual interposer logic, wherein the speculative read functionality comprises logic for repeatedly issuing speculative isochronous read requests to the second at least partial device driver stack, results of the isochronous read requests being used by the first host computer to satisfy an actual isochronous read request generated by the first at least partial device driver stack, without transmitting the actual isochronous read request to the second host computer.

2. The system of claim 1, wherein the speculative write completion functionality comprises:

logic for receiving a kernel representation of an isochronous write request from the first at least partial device driver stack; and logic for communicating the isochronous write request to the first send/receive logic for transmission to the second host computer.

3. The system of claim 1, wherein the speculative read functionality comprises:

logic for communicating results from the speculative isochronous read requests to the second send/receive logic for transmission to another host computer.

4. The system of claim 3, further comprising:

a buffer in the first host computer for buffering results of the speculative isochronous read requests received from the second host computer; and logic in the first host computer for satisfying, from the buffer, an actual isochronous read request generated by the first at least partial device driver stack, without transmitting the actual isochronous read request to the second host computer.

5. The system of claim 3, further comprising:

a buffer in the second host computer for buffering results of the speculative isochronous read requests; and logic in the first host computer for satisfying, from the buffer in the second computer, an actual isochronous read request generated by the first at least partial device driver stack.

6. The system of claim 3, further comprising:

a buffer in a third host computer for buffering results of the speculative isochronous read requests; and logic in the first host computer for satisfying, from the buffer in the third computer, an actual isochronous read request generated by the first at least partial device driver stack, without transmitting the actual isochronous read request to the second computer.

7. The system of claim 3, wherein:

the logic for repeatedly issuing speculative isochronous read requests becomes active in response to the second host computer having received at least one actual isochronous read request from the first host computer.

8. The system of claim 3, wherein:

the logic for repeatedly issuing speculative isochronous read requests becomes active in response to a predetermined pattern of writes and reads on the peripheral device having been detected.

9. The system of claim 3, wherein:

the logic for repeatedly issuing speculative isochronous read requests becomes active in response to a predetermined pattern of writes on the peripheral device having been detected.

10. The system of claim 1, wherein:

the peripheral device is a USB device.

* * * * *